United States Patent [19]

Lukas

[11] 4,056,819
[45] Nov. 1, 1977

[54] ADDRESS CONVERTER

[75] Inventor: Eberhard Lukas, Wolfratshausen, Germany

[73] Assignee: Siemens Aktiengesellschaft, Berlin & Munich, Germany

[21] Appl. No.: 655,145

[22] Filed: Feb. 4, 1976

[30] Foreign Application Priority Data

Feb. 26, 1975 Germany .............................. 2508373

[51] Int. Cl.² .......................... G11C 8/02; G06F 5/00
[52] U.S. Cl. .............................. 340/347 DD; 364/200
[58] Field of Search ...................... 340/347 DD, 172.5

[56] References Cited

U.S. PATENT DOCUMENTS 3,425,039  1/1969  Bahrs et al. ...................... 340/172.5

*Primary Examiner*—R. Stephen Dildine, Jr.
*Attorney, Agent, or Firm*—Hill, Gross, Simpson, Van Santen, Steadman, Chiara & Simpson

[57] ABSTRACT

An address converter for converting first addresses into second addresses which are fed to a memory of the data processing device, where the first addresses contain first and second address words and the second addresses contain third and fourth address words, the address words representing binary numbers, employs a comparator which is supplied with the first address word and a predetermined binary number and which is responsive thereto to emit a binary signal which assumes a first or a second binary value when the first address word is smaller than, or is not smaller than, respectively, the binary number, a transfer switch which assumes a first condition and a second condition when the binary signal assumes the first and second binary values, respectively, and which in the first and second positions, respectively, switches through the first address word or the binary number as a third address word, respectively, and an allocator which is supplied with the first and the second address words and which emits the fourth address word to the memory.

7 Claims, 14 Drawing Figures

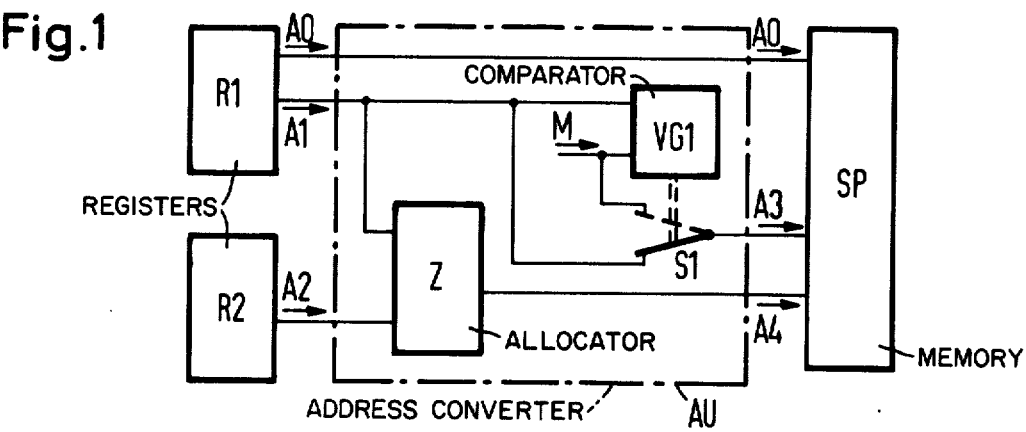

| A1\A2 | 0 | 1 | | R-1 |
|---|---|---|---|---|
| 0 | 0,0 | 1,0 | | R-1,0 |
| 1 | 1,1 | 2,1 | | 0,1 |
| | | | | |
| M-1 | R-1,M-1 | 0,M-1 | | R-2,M-1 |
| M | 0,M | 1,M | | R-1,M |
| M+1 | 1,M | | | 0,M |
| | | R-1,M | | |
| N-1 | R-1,M | 0,M | | R-2,M |

| A1\A2 | 0 | 1 |
|---|---|---|
| 0 | 0,0 | 1,0 |
| 1 | 1,1 | 0,1 |
| 2 | 0,2 | 1,2 |
| 3 | 1,2 | 0,2 |

Fig. 5
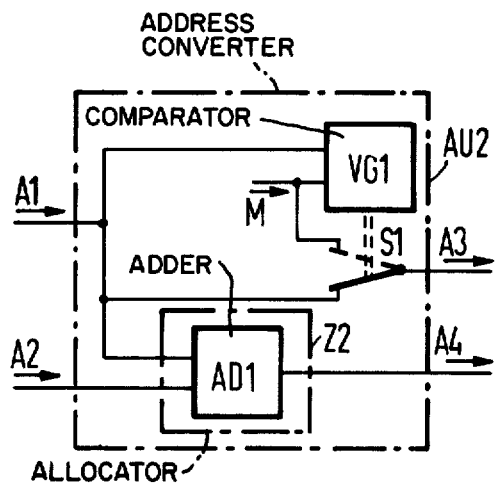
Fig. 6
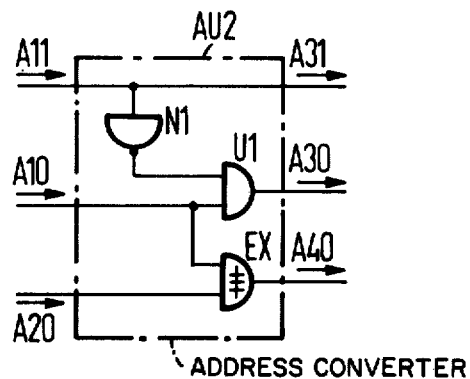
Fig. 7a
| A3\A4 | 0 | 1 |
|---|---|---|
| 0 | 0,0 | 1,0 |
| 1 | 0,1 | 1,1 |
| 2 | 0,2 | 1,2 |
| 3 | 0,3 | 1,3 |
Fig. 7b
| A1\A2 | 0 | 1 | 2 | 3 |
|---|---|---|---|---|
| 0 | 0,0 | 1,0 | 0,3 | 1,3 |
| 1 | 1,1 | 0,1 | 1,3 | 0,3 |
|  |  |  | 1,0 | 0,0 |
| 2 | 0,2 | 1,2 | 0,2 | 1,2 |
| 3 | 1,2 | 0,2 | 1,2 | 0,2 |

ADDRESS CONVERTER

BACKGROUND OF THE INVENTION

1. Field of the Invention

This invention relates to an address converter for converting first addresses into second addresses which are fed to a memory in a data processing device, and more particularly to such an address converter wherein the first addresses contain first and second address words, the second addresses contain third and fourth address words and the address words represent binary numbers.

2. Description of the Prior Art

It is already well known in the art to determine the addresses of a memory in a data processing device by address substitution, which is also known as indirect addressing. In the case of address substitution of this type, the address component of the machine command is replaced by the contents of a storage cell or a register. Indirect addressing can also be carried out as addressing by base addresses and distance addresses. In this type of addressing the address component of the machine command contains the distance address which indicates the distance of a point of the store to a start of a zone, and the start of a zone is determined by the contents of a register containing the base address.

In addressing using an index register, in order to determine the actual store address, the contents of an index register is added to or subtracted from the contents of the address component of the machine command. Addressing of storage cells by means of address substitution and with the aid of the index registers has the disadvantage, however, that the conversion of the addresses requires a substantial outlay, as often it is necessary to carry out an extensive address calculation. This also results in an increase in the processing time, required for processing the individual processes, in the data processing device.

SUMMARY OF THE INVENTION

It is the object of the invention to provide an address converter with the aid of which, in the processing of a plurality of processes by a data processing system, it is easily possible for the addresses of the storage zones in the memory of the data processing system to be changed independence upon the processes, and for the individual processes to be coordinated.

According to the invention, the foregoing object is realized in an address converter of the type generally described above in the introduction by a comparator which is supplied with the first address word and a predetermined binary number, and which emits a binary signal which assumes a first and a second binary value when the first address word is smaller than, or is not smaller than, respectively, the binary number, by a transfer switch which assumes a first and a second position when the binary signal assumes the first and second binary value, respectively, and which in the first and second positions switches through the first address word or the binary number as a third address word, respectively, and by an allocator which is supplied with the first and the second address words and which emits the fourth address word.

The address converter constructed in accordance with the invention has the advantage that it requires only a low outlay and that the programming of the processes is considerably simplified, and thus the time duration for the processing of the processes is shortened. With the aid of the address converter it is possible to process a plurality of similar processes by one and the same program. The individual processes are communicated via various storage zones which can be addressed under the same relative addresses. The simplification of the programming is particularly effective when a plurality of processes are to be processed simultaneously on a t.d.m. (time division multiplex) basis.

A simple conversion of the first addresses into the second addresses, in which the second address words are cyclically permutated and emitted at the output as fourth address words is achieved if the allocator contains a modulo-R adder which is supplied with the first and second address words and which emits the fourth address word, where R indicates the range of values of the fourth address word.

If the cyclic permutation of the first address word is effected only when the first address word exceeds a given binary number, it is expedient if the first input of the modulo-R adder is preceded by a subtracter which forms the difference between the first address word and the binary number, if the second input of the modulo-R adder is supplied with the second address word, and if the second transfer switch is provided which, in the same way as the first transfer switch, assumes a first and a second position and via which in the first position a second address word, and in the second position the address word at the output of the modulo-R adder is provided as a fourth address word to the output, and thus to the memory.

If the address converter addresses further storage zones which can be addressed by the range of values of the first address word, it is advantageous to provide, in the connection path between the input at which the first address word is present, and the first transfer switch, a third transfer switch which assumes a first position when the second address word is no smaller than a maximum value of the fourth address word and via which, in this position, the first address word is advanced to the first transfer switch, and which otherwise assumes a second position in which the sum, formed in a modulo-N adder, of the first address word and the binary number, increased by one, is advanced to the first transfer switch, where N indicates the range of values of the third address word.

The further storage zones are advantageously assigned to additional processes when the first input of the modulo-N adder is preceded by a further adder which modulo-B converts the first address word, where B is equal to the difference between N and the binary number increased by one, and when the second input of the modulo-N adder is supplied with the binary number increased by one.

The address converter requires a very low outlay if the transfer switches, adders, subtracter and comparators are constructed in a form of binary logic linking elements.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of a storage arrangement provided with an address converter constructed in accordance with the present invention;

FIG. 2a–FIG. 2d schematically illustrate addresses of storage zones of a memory and allocation schedules for a first address converter;

FIG. 5 is a schematic block circuit diagram of a second address converter;

FIG. 6 is a schematic logic circuit diagram of the second address converter;

FIGS. 7a–7b schematically illustrate addresses of storage zones and an allocation schedule for a third address converter;

DESCRIPTION OF THE PREFERRED EMBODIMENTS

Figures 3, 4A, 4B:
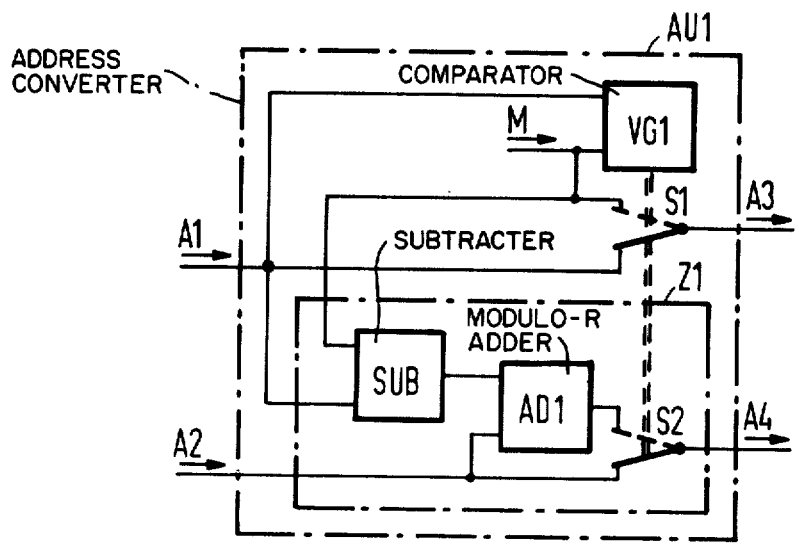
FIG. 3 is a schematic block diagram of a first address converter.
FIG. 4a–FIG. 4b illustrate allocation schedules for a second address converter.

The block circuit diagram illustrated in FIG. 1 shows the memory SP in a data processing system, an address converter AU and two registers R1 and R2. The memory SP consists of a plurality of storage zones, each of which contain a plurality of storage cells. A first part of the storage cells is individually assigned to a plurality of processes to be processed by the data processing system. A second part of the storage cells is commonly assigned to these processes. The individual processes can, for example, be coordinated via these common storage cells.

The sequence of the processes to be processed by the data processing system is controlled by programs consisting of machine commands. If, for example, a plurality of similar processes are being simultaneously processed by the data processing system, is expedient to process these processes by one and the same program. Each of these processes is individually assigned specific storage cells. If, furthermore, processes are dependent upon one another, for example, in respect of occupied input/output channels, specific storage cells are commonly assigned to these processes. Then, the processes are coordinated via these common storage cells.

The addresses of the storage cells are input as first addresses into the first and second registers R1 and R2. These first addresses each contain a first address word A1 and a second address A2, each of which represent the binary numbers. The address word A1, for example, forms part of the address word of the machine command and indicates a relative address. It is stored in the register R1. The address A2 indicates the process for which the address word A1 serves as a relative address and is stored in the register R2. The address word A2 can also serve to indicate one of several program levels or conditions.

The first address also contains an address word A0 which indicates the address of the particular addressed storage cell within the storage zones, likewise in the form of a binary number. As, however, in most cases changes are made not in individual storage cells, but entire storage zones, in the following this address word A0 will not be taken into consideration. In these cases, it is conducted directly to the memory SP bypassing the address converter AU.

The address words A1 and A2 are conducted as the first address to the address converter AU. From this first address, the address converter produces a second address which is conducted, as an absolute address of the addressed storage zone, to the memory SP. The second address consists of a third address word A3 and a fourth address word A4, each of which also represents a binary number. If a matrix-like memory SP is being utilized, it is expedient to assign the address words A3 and A4 to the columns and rows of the matrix. For example, the address word A3 indicates the row and the address word A4 indicates the column of the memory SP.

The address converter AU contains an allocator Z, a comparator VG1 and a transfer switch S1. The comparator VG1 compares the address word A1 with a given binary number M which indicates the address word A3 for those storage zones which are commonly assigned to a plurality of processes. In dependence upon the result of the comparison, the transfer switch S1 is brought into the solid line or broken line position.

As long as the address word A1 is smaller than the binary number M, the comparator VG1 emits a binary signal having the binary value "1", and the transfer switch S1 occupies the solid line position. In this case, those storage zones which are individually assigned to the processes are addressed. The address word A1 is emitted as the address word A3, and the address word produced in the allocator Z, in dependence upon the address words A1 and A2, is emitted as the address word A4.

When the address word A1 is equal to or greater than the binary number M, the binary signal assumes the binary value "0" and the transfer switch S1 is operated into the broken line position, and the binary number M is emitted as the third address word A3. Thus, those storage zones which are commonly assigned to a plurality of processes are addressed. Also, in this case, the address word A4 is produced from the address words A1 and A2 in the allocator Z.

The matrix-like memory SP, schematically illustrated in FIG. 2a, possesses N rows 0 to N−1, of which initially only M + 1 rows 0 to M will be considered and R columns 0 to R−1. The address word A3 indicates the row and the address word A4 indicates the column of the memory SP. The absolute addresses of the storage zones are determined by two characteristics, the first designating the column and the second designating the row. The storage zones 0, 0 to R−1,M in the rows 0 to M−1 and in each case in a column are individually assigned to a process. The storage zones 0,M to R−1,M in row M are commonly assigned to all the processes indicated by the address word A2.

The allocation schedule illustrated in FIG. 2b for a first address converter AU1 illustrates the allocation between the first and the second addresses. The address words A3 and A4 agree with the address words A1 and A2 in the rows 0 to M. The number of addresses which can be indicated by the address word A1 is, however, greater than M, as in the processing of each process it is necessary to also address those stores which are commonly assigned to all of the processes. Therefore, in the rows M+1 to N−1 are indicated the storage zones which are commonly assigned to the processes indicated the address words A2. The addresses indicated in the rows M+1 to N−1 are cyclically permutated.

If, for example, the (N−1)th row is called up by the address word A1, then in dependence upon the process indicated by the address word A2, the storage zones R−1,M to R−2,M are addressed. With the aid of the same address words A1 contained in the addresss component of a machine command, thus differing storage zones are addressed in the individual processes.

The memory SP illustrated in FIG. 2c consists, for example, of eight storage zones which are arranged in R=2 columns and N=4 rows. Of these storage zones, firstly only the storage zones contained in the rows 0 to 2 will be considered. The storage zones in the rows 0 and 1 are each individually assigned to a process and the storage zones in the row M=2 are commonly assigned to both processes.

FIG. 2d illustrates a corresponding allocation schedule for this store. In dependence upon the particular process to be processed, either the storage zones 0,0 to 1,1 individually assigned to the processes, or the storage zones 0,2 or 1,2 commonly assigned to the processes are continued under the same address word A1. For example, under the address word A1=3, either the storage zones with the addresses 1,2 or 0,2 are approached.

The block circuit diagram illustrated in FIG. 3 of a first address converter AU1 shows the comparator VG1, the transfer switch S1 and a first allocator Z1. The comparator VG1 is likewise supplied with the address word A1 and the binary number M, for example, in the form of dual numbers. The binary number M indicates the row of the memory SP which is commonly assigned to a plurality of processes. At the output of the comparator VG1 a binary signal is emitted which, for example, assumes the binary value "1" when the address word A1 is smaller than M and assumes the binary value "0" when the address word A1 is equal to or greater than M. This signal controls the transfer switch S1 which, for example, consists of binary logic linking elements.

The allocator Z1 contains a transfer switch S2 which is likewise controlled by the comparator VG1, a subtracter SUB and a modulo-R adder AD1, where R indicates the range of values of the address word A3.

As long as the address word A1 is smaller than the binary number M, the transfer switches S1 and S2 assume the solid line positions. Thus, the address words A1 and A2 are switched through as the address words A3 and A4, respectively, to the output of the address converter AU1. However, as soon as the address word A1 is equal to or greater than the binary number M, the transfer switches S1 and S2 are operated into the broken line positions. Thus, the binary number M is emitted as the address word A3. With the aid of the subtracter SUB and the adder AD1, an address word A4 is produced which selects one of the storage zones from the row M of the memory SP.

The subtracter SUB forms the difference between the address word A1 and the binary number M. This difference is added to the address word A2 with the aid of the adder AD1. The sum is emitted via the transfer switch S2 as the address word A4. The subtracter SUB and the adder AD1 serve to cyclically permutate the address word A4 in dependence upon the address words A1 and A2.

If a subtracter SUB is utilized which emits a signal when a carry occurs, this signal can be used as a control signal for the transfer switches S1 and S2. In this case, the comparator VG1 is not required.

For example, in the case of the memory SP represented in FIG. 2c, in the presence of an address word A1=3, the transfer switches S1 and S2 are operated into the broken line positions. The subtracter SUB emits the term 3−2=1 and the value of either "1" or "0" is emitted at the output of the adder AD1 as the address word A4, in dependence upon whether the address word A2 assumes the value "0" or "1".

In the allocation schedule represented in FIG. 4a, the address words A4 are cyclically permutated also in the storage zones which are assigned to the individual processes. In this manner, the address converter circuit is substantially simplified.

FIG. 4b illustrates an allocation schedule for the memory illustrated in FIG. 2c, in which the address words A4 in the rows 0 and 1 are also cyclically permutated.

The second address converter AU2, illustrated in FIG. 5, which serves to assign the addresses in accordance with the allocation tables represented in FIG. 4, differs from the first address converter AU1 represented in FIG. 3 in that, because of the cyclic permutation of the address words A4, the subtracter SUB and the transfer switch S2 are not required.

The circuit diagram represented in FIG. 6 of the second address converter AU2 for the allocation of the addresses in accordance with the allocation schedule represented in FIG. 4b, consists of an AND gate U1, an inverter N1, and an EXCLUSIVE OR gate EX. The address words A1 and A2 are supplied in the form of dual numbers. The address word A1 is represented by signals A11 and A10 and the address word A3 is represented by the signals A31 and A30. The signals A11, A10 and A31, A30 indicate the higher and lower value digits, respectively, of the dual numbers.

In the circuit diagram, the EXCLUSIVE-OR gate EX corresponds to the adder AD1, whereas the AND gate U1 corresponds to the transfer switch S1. The comparator VG1 has been dispensed with as the signal A11 always assumes the binary value "1" when the address word A1 is greater than or equal to M=2. The AND gate U1 is controlled by way of the inverter N1.

The binary values of the signals A30 and A31 are identical to those of the signals A10 and A11, as long as the address word A1 is not greater than 2. In this case, the signal A30 always assumes the binary value "0." The address word A2 is represented by the signal A20. In the event that the signal A20 is equal to 0, the signal A40 is always equal to the signal A10, and in the event that the signal A20 is equal to 1, it is always equal to the inverted signal A10.

The matrix-like memory SP schematically illustrated in FIG. 7a consists, in the same manner as the memory illustrated in FIG. 2c, of eight storage zones which are arranged in R=2 columns and N=4 rows. The storage zones in the rows 0 and 1 are again, in each case, individually assigned to a process, and the storage zones in row 2 are commonly assigned to a plurality of processes. The storage zones in row 3 are again individually assigned to one, or also to a plurality of processes. This manner of dividing up the memory SP ensures that when the address word A3 is represented by dual numbers, the zone of the memory SP which can be addressed with two binary characters is fully exploited. In this case, again, two binary characters must again be made available as the address word A2 in order to be able to indicate further processes which can address the storage zones arranged in row 3 of the memory SP.

The allocation schedule represented in FIG. 7b relates to a third address converter which differs from the converter represented in FIG. 4b in that it is extended by the columns 2 and 3, the storage zones of the columns 2 and 3 being assigned to a third process and a fourth process. In carrying out these processes, the common storage zones 0,2 and 1,2 can likewise be addressed. In this way it is also possible to coordinate these processes with the first two processes.

The allocation of the storage zones in row 1 and in the columns 2 and 3 of the allocation schedule can be effected in two different ways, as illustrated in FIG. 7b. Either the storage zones 1,3 and 0,3 are addressed or the storage zones 1,0 and 0,0 of the first and second processes are addressed. In this second case only the storage zones 1,1/0, 1/0,3 and 1,3 are assigned individually to the relevant processes, and with each process two storage zones can be addressed by other processes. The assignment between address and addressed storage zones is generally governed by the rule that irrespectively of the value of A1 and A2, the address word A4 is equal to the SUM of the address words A1 and A2 modulo-R. In dependence upon the values of the words A1 and A2, the values for the address word A3 can be obtained from the following table.

|  |  | A2 |  |
| --- | --- | --- | --- |
|  |  | $<R$ | $\geq R$ |
| A1 | $<M$ | A1 | either $(M + 1) + (A1) \bmod [N - (M + 1)]$ or $[(M + 1) + A1] \bmod N$ |
|  | $\geq M$ |  | M |

In the portion of the table in which the address word A1 is smaller than M and the address word A2 is greater than or equal to R, the allocation rules for the first and the second situations are provided in the upper and lower rows, respectively.

Figure 8:
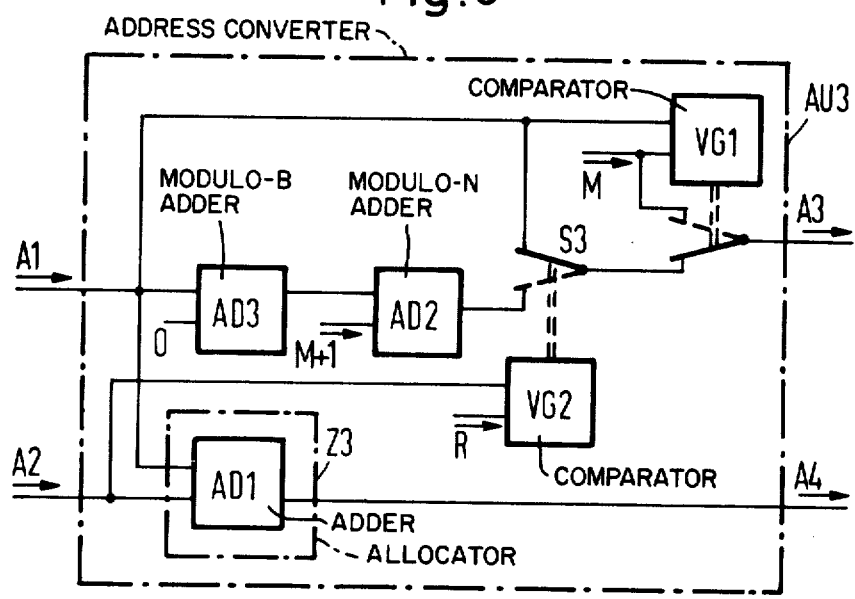
FIG. 8 is a schematic block diagram of a third address converter.

A third address converter AU3, illustrated in FIG. 8, comprises, in the same manner as the address converters AU1 and AU2, the transfer switch S1, the comparator VG1 and the adder AD1. It also comprises a transfer switch S3 which is controlled by a second comparator VG2. The transfer switch S3 remains in the solid line position as long as the address word A2 is smaller than R. Otherwise, the transfer switch S3 is operated into the condition represented by the broken line showing. Thus, the address word A1 is no longer switched through as the address word A3, but an address word is selectively produced with the aid of the second adder AD2, and possibly with the aid of a third adder AD3 as set forth hereinbelow.

In the first situation illustrated in the table, the address word A1 is modulo-B converted, where B is equal to $N - (M + 1)$. The conversion is effected with the aid of the adder AD3 at one input of which the address word A1 is present and at a second input of which the value 0 is present. Then, with the aid of the modulo-N adder AD2, the value $M + 1$ is added. The address word obtained in this manner is switched through via the transfer switches S3 and S1 and emitted as the address word A3.

For the second situation illustrated in the table, the modulo-B adder AD3 is not required and the address word A3 is produced by adding the address word A1 and the binary number $M + 1$ in the modulo-N adder AD2.

If the address word A1 is greater than M, the transfer switch S1 is operated into a condition illustrated by the broken line position, as in the case of the address converters AU1 and AU2, and the binary number M is switched through as the address word A3.

Figure 9:
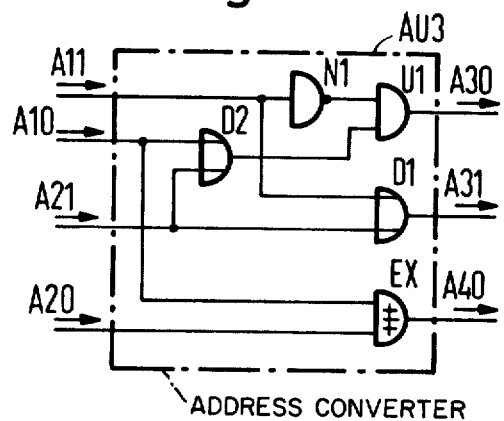
FIG. 9 is a schematic logic circuit diagram of a third address converter.

In FIG. 9 a circuit diagram illustrates the construction of an address converter AU3 for the assignment of addresses corresponding to the allocation schedule shown in FIG. 7. For the first situation the circuit comprises, like the address converter illustrated in FIG. 6, an inverter N1, an AND gate U1 and an EXCLUSIVE-OR gate EX. A signal A21 which indicates the higher-value digit of the address word A2 is switched through via an OR gate D1 to the output where it is emitted as a signal A31 which indicates the higher-value digit of the address word A3. The signal A21 is also fed by way of a first input of another OR gate D2 to the AND gate U1. The second input of the OR gate D2 is supplied with the signal A10. The OR gate D1 and the AND gate U1 correspond to the transfer switches S1 and S3 and, in part, to the comparator VG2. The OR gate D2 corresponds to the adders AD2 and AD3 and, also in part, to the comparator VG2.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An address converter for converting first addresses into second addresses which are fed to a memory of a data processing device, wherein the first addresses contain first and second address words and the second addresses contain third and fourth address words, said address converter comprising:
   a comparator for receiving a first address word and a predetermined binary number and responsive thereto to provide a first binary value when the first address word is less than the predetermined binary number and a second binary value when the first address word is not less than the predetermined binary number;
   transfer switch means for receiving the first address word and the predetermined binary number, said transfer switch means connected to the memory and connected to and operated by said comparator to selectively feed the first address word and the predetermined binary number to the memory as a third address word in response to the first and second binary values, respectively; and
   an allocator for receiving the first and second address words, said allocator connected to the memory and responsive to the first and second address words to feed a fourth address word to the memory.

2. The address converter set forth in claim 1, wherein said allocator comprises a modulo-R adder which receives the first and second address words and emits the fourth address word, where R indicates the range of values of the fourth address word.

3. The address converter set forth in claim 2, wherein said modulo-R adder includes first and second inputs and an output, and said allocator further comprises a subtracter and other transfer switch means, said subtracter including an output connected to said first input of said modulo-R adder and receiving and providing the difference between the first address word and the predetermined binary number, said other transfer switch means connected to receive the second address word, to said output of said modulo-R adder, to the memory and connected to and operated by said comparator to selectively feed the second address word and the output signals of the modulo-R adder to the memory as the fourth address word in response to the first and second binary values, respectively.

4. The address converter set forth in claim 3, wherein said comparator, said transfer switch means, said modulo-R adder, said subtracter and said other transfer switch means are constructed in the form of binary logic linking elements.

5. The address converter set forth in claim 1, comprising:
   a second comparator receiving the second address word and a second predetermined binary number and responsive thereto to provide a first binary value when the second address word is less than the maximum value of fourth address word which corresponds to the second predetermined binary number, and a second binary value when the second address word is not less than the second predetermined binary number;
   a modulo-N adder for receiving the first address word and the first-mentioned predetermined binary number increased by one, where N indicates the range of values of the third address words; and
   other transfer switch means connected to said second comparator and to the first-mentioned transfer switch means and connected to selectively receive and feed to the first-mentioned transfer switch means the first address word and the output of said modulo-N adder in response to the first and second binary values, respectively, from said second comparator.

6. The address converter set forth in claim 5, and further comprising:
   a modulo-B adder connected ahead of said modulo-N adder to receive and modulo-B convert the first address word before modulo-N conversion and feeding to said other transfer switch means, where B is equal to the difference between N and the first-mentioned predetermined binary number increased by one.

7. The address converter set forth in claim 6, wherein said comparators, said transfer switch means and said adders are constructed in the form of binary logic linking elements.

* * * * *